US011829966B2

(12) United States Patent
Rosano et al.

(10) Patent No.: US 11,829,966 B2
(45) Date of Patent: *Nov. 28, 2023

(54) SYSTEMS AND METHODS FOR TRACKING ACCESS DATA TO A DATA SOURCE

(71) Applicant: MASTERCARD INTERNATIONAL INCORPORATED, Purchase, NY (US)

(72) Inventors: Sharon Amy Rosano, New Canaan, CT (US); John D. Chisholm, Ballwin, MO (US); Michelle L. Hafner, Chesterfield, MO (US); Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/165,164

(22) Filed: Feb. 2, 2021

(65) Prior Publication Data

US 2021/0158314 A1 May 27, 2021

Related U.S. Application Data

(63) Continuation of application No. 15/331,601, filed on Oct. 21, 2016, now Pat. No. 10,909,513.

(51) Int. Cl.
*G06Q 40/00* (2023.01)
*G06Q 20/10* (2012.01)
(Continued)

(52) U.S. Cl.
CPC ....... *G06Q 20/102* (2013.01); *G06F 21/6245* (2013.01); *G06Q 10/10* (2013.01)

(58) Field of Classification Search
CPC ....... G06Q 40/00; G06Q 20/102; G06Q 10/10
See application file for complete search history.

(56) References Cited

U.S. PATENT DOCUMENTS 5,917,500 A 6/1999 Johnson et al.
6,997,378 B2 2/2006 Phillips et al.
(Continued)

FOREIGN PATENT DOCUMENTS

WO WO-2013056151 A1 * 4/2013 ............. G06Q 30/02

OTHER PUBLICATIONS

BlackBerry (BB) issued new patent [U.S. Pat. No. 9,436,348], News Bites—Telecommunications; Melbourne [Melbourne] Sep. 7, 2016. (Year: 2016).*

(Continued)

*Primary Examiner* — Lalita M Hamilton
(74) *Attorney, Agent, or Firm* — Armstrong Teasdale LLP

(57) ABSTRACT

An automatic billing updater (ABU) manager computing device for managing an account information data source and tracking access to the account information data source is provided. The ABU manager computing device receives account data from an issuing party, stores the account information in an account information data source, and provides the account data to requesting parties. The ABU manager computing device tracks access to the stored account data via an ABU traffic data source. ABU manager computing device may also track transaction-related messages corresponding to the stored account data in a transaction traffic data source. In certain embodiments, ABU manager computing device may generate and transmit notifications based on data stored in one or more of the stored account data, the ABU traffic data source, and the transaction traffic data source.

20 Claims, 6 Drawing Sheets

(51) Int. Cl.
 *G06Q 10/10* (2023.01)
 *G06F 21/62* (2013.01)

(56) References Cited

U.S. PATENT DOCUMENTS

| | | |
|---|---|---|
| 7,035,872 B2 | 4/2006 | Phillips et al. |
| 7,424,455 B2 | 9/2008 | Kellog et al. |
| 7,806,323 B2 | 10/2010 | Fomitchev |
| 7,850,080 B2 | 12/2010 | Guillot et al. |
| 7,904,389 B2 | 3/2011 | Digioacchino |
| 7,925,587 B2 | 4/2011 | Digioacchino |
| 7,966,257 B2 | 6/2011 | Digioacchino |
| 8,706,622 B2 | 4/2014 | Winter et al. |
| 9,947,007 B2 | 4/2018 | Greenbaum et al. |
| 2005/0075977 A1 | 4/2005 | Carroll et al. |
| 2005/0149544 A1 | 7/2005 | Bishop et al. |
| 2008/0040265 A1 | 2/2008 | Rackley, III et al. |
| 2009/0171839 A1 | 7/2009 | Rosano et al. |
| 2009/0173783 A1 | 7/2009 | Fomitchev |
| 2010/0036769 A1 | 2/2010 | Winters et al. |
| 2010/0191678 A1 | 7/2010 | Steed et al. |
| 2010/0299253 A1 | 11/2010 | Patterson |
| 2011/0153500 A1 | 6/2011 | Digioacchino |
| 2012/0072349 A1 | 3/2012 | Bernstein et al. |
| 2012/0084135 A1* | 4/2012 | Nissan ............... G06Q 30/0238 705/14.38 |
| 2012/0136780 A1 | 5/2012 | El-Awady et al. |
| 2012/0296824 A1 | 11/2012 | Rosano |
| 2013/0024368 A1 | 1/2013 | Scammell |
| 2013/0030972 A1 | 1/2013 | Digioacchino |
| 2013/0097004 A1* | 4/2013 | Fink ..................... G06Q 30/02 705/14.27 |
| 2013/0346302 A1 | 12/2013 | Purves et al. |
| 2014/0032409 A1 | 1/2014 | Rosano |
| 2014/0067714 A1 | 3/2014 | Melton et al. |
| 2014/0214654 A1 | 7/2014 | Greenbaum et al. |
| 2014/0258099 A1 | 9/2014 | Rosano |
| 2014/0337215 A1 | 11/2014 | Howe |
| 2015/0161641 A1 | 6/2015 | Barnes et al. |
| 2016/0125405 A1 | 5/2016 | Alterman et al. |

OTHER PUBLICATIONS

PCT International Search Report and Written Opinion, Application No. PCT/US2017/055702, dated Jan. 24, 2018, 12 pps.

* cited by examiner

SYSTEMS AND METHODS FOR TRACKING ACCESS DATA TO A DATA SOURCE

CROSS REFERENCE TO RELATED APPLICATIONS

This application is a continuation application of U.S. patent application Ser. No. 15/331,601, filed Oct. 21, 2016, entitled "SYSTEMS AND METHODS FOR TRACKING ACCESS DATA TO A DATA SOURCE", the disclosure of which is hereby incorporated herein by reference in its entirety.

BACKGROUND

The field of the disclosure relates generally to tracking access data to a data source and, more particularly, to network-based systems and methods for managing and tracking access to an account information data source.

The same data may be stored in multiple locations within a computer network. For example, data may be stored in a first location within a network while the same data is also stored in another (second) location. In some cases, data stored in the first location may become outdated or stale when the same data is updated at the second location. In at least some of these cases, it is important to update the data stored in the first location with the updated data that is stored at the second location. However, there are many challenges associated with updating such stale data especially when the stale data may be stored in multiple locations, and in ensuring that the actual updates have occurred.

For example, in the payment card industry at least some payment transactions are performed where the cardholder makes a purchase, but the physical payment card is not present for the merchant to inspect when the purchase is made. These transactions are known as "card-not-present" (CNP) transactions. In such transactions, information regarding the payment card, including an account number and, in many instances, an expiration date for the payment card is transmitted from a merchant, along with an indicator that the transaction is a CNP transaction. An "account-on-file" transaction is a type of transaction in which the merchant stores information regarding the cardholder's payment card in a database, then retrieves the stored payment card information and includes it in an authorization request message submitted when processing the transaction. One specific type of account-on-file transaction is a "recurring payment transaction," which a merchant initiates on a recurring basis for a particular cardholder. In such recurring payment transactions, the merchant stores information regarding the cardholder's payment card in a database, then retrieves the stored payment card information and includes it in each recurring authorization request message.

An example is a gym membership. Rather than mailing a monthly check for membership with a gym, a cardholder might choose to register a payment card, such as a credit card, a debit card, or a prepaid card, with the gym. Registering the payment card with the gym enables the gym to automatically charge the payment card for the monthly dues on a particular day each month. In some such systems, the merchant stores an account number, an expiration date, and/or other information associated with the payment card and/or cardholder. Given the convenience of this payment model for both merchants and cardholders, it finds use in many other scenarios where a cardholder is a member of a club or subscriber of products or services. Accordingly, multiple merchants may have stored payment card information for the same cardholder. Likewise, any given merchant may have stored payment card information for multiple cardholders.

In addition to recurring payment transactions, merchants may also maintain account-on-file information to facilitate payment card transactions by repeat customers. For example, an online merchant may allow a shopper to create an online account and store account data corresponding to one or more methods of payment. When the shopper is ready to check out and complete a purchase, the shopper may simply select one of the stored payment methods as opposed to having to re-enter their payment card information.

A downside of storing payment card information, however, is that information regarding a payment card is subject to change. For example a cardholder's payment card might expire, causing a new payment card to be issued with a new expiration date while the card number remains the same. In such instances, an authorization request message containing the outdated expiration date is denied by the issuer of the payment card. As a result, the merchant that originally submitted the authorization request is prevented from successfully obtaining payment until the merchant acquires the updated expiration date for the payment card. Due to wide adoption of the account-on-file payment model by merchants and cardholders, it is understandably difficult for a cardholder to update each merchant with new payment card expiration dates. Likewise, it reduces the benefits of the account-on-file payment model to require a merchant to inquire with each cardholder for an updated payment card expiration date prior to submitting each payment authorization request.

In light of the foregoing, at least some known systems may provide merchants with updated cardholder payment card information. However, to obtain the updated account data in such systems, a merchant must submit an account query corresponding to one or more payment card accounts to the merchant's acquiring bank which then forwards the query to a central account data system. In response to the query, the account data system retrieves corresponding account data received from an issuer and transmits the retrieved account data to the acquiring bank. The acquiring bank may then forward the retrieved account data to the merchant, which may then update its database of account-on-file payment card information.

These known systems are limited in several ways. For example, these known systems do not guarantee that a merchant will actually update its account-on-file account data or do so in a timely manner. Similarly, these known systems do not permit issuers to determine the efficacy of promulgated updates, for example, by determining the number of merchants receiving account data and which of those merchants have updated account data. In light of the foregoing, an enhanced account data system is needed, wherein the enhanced systems and methods address these problems and others.

BRIEF DESCRIPTION OF THE DISCLOSURE

In one aspect, an automatic billing updater (ABU) manager computing device is disclosed. The ABU manager computing device includes one or more processors in communication with one or more memory devices and is configured to: receive current account data from an issuing party; store the current account data in an ABU account information data source based on a plurality of account identifiers; receive an update request from a requesting party, the update request including a requesting party identifier corresponding to the requesting party and a requested account identifier corresponding to one of the plurality of account identifiers, the update request requesting current account data corresponding to the requested account identifier; generate an update response, the update response including the requested current account data and computer implementable instructions for causing a client device to transmit a receipt notification; transmit the update response to the requesting party; automatically receive a receipt notification from the requesting party, the receipt notification indicating whether the requesting party successfully updated a requesting party account information data source with the requested current account data; and update an ABU traffic data source to indicate whether the requesting party successfully updated the requesting party account information data source with the requested account data.

In a second aspect, a computer-implemented method for tracking access data for a data source including notifications of data updates from client devices. The method is implemented using an ABU manager computing device in communication with one or more memory devices. The method includes: receiving current account data from an issuing party; storing the current account data in an ABU account information data source based on a plurality of account identifiers; receiving an update request from a requesting party, the update request including a requesting party identifier corresponding to the requesting party and a requested account identifier corresponding to one of the plurality of account identifiers, the update request requesting current account data corresponding to the requested account identifier; generating an update response, the update response including the requested current account data and computer implementable instructions for causing a client device to transmit a receipt notification; transmitting the update response to the requesting party; automatically receiving a receipt notification from the requesting party, the receipt notification indicating whether the requesting party successfully updated a requesting party account information data source with the requested current account data; and updating an ABU traffic data source to indicate whether the requesting party successfully updated the requesting party account information data source with the requested account data.

In yet another aspect, a computer-readable storage medium having computer-executable instructions embodied thereon is provided. When executed by an ABU manager computing device having one or more processors in communication with one or more memory devices, the computer-executable instructions cause the ABU manager computing device to: receive current account data from an issuing party; store the current account data in an ABU account information data source based on a plurality of account identifiers; receive an update request from a requesting party, the update request including a requesting party identifier corresponding to the requesting party and a requested account identifier corresponding to one of the plurality of account identifiers, the update request requesting current account data corresponding to the requested account identifier; generate an update response, the update response including the requested current account data and computer implementable instructions for causing a client device to transmit a receipt notification; transmit the update response to the requesting party; automatically receive a receipt notification from the requesting party, the receipt notification indicating whether the requesting party successfully updated a requesting party account information data source with the requested current account data; and update an ABU traffic data source to indicate whether the requesting party successfully updated the requesting party account information data source with the requested account data.

BRIEF DESCRIPTION OF THE DRAWINGS

FIG. 1 is a schematic diagram illustrating a payment platform having an ABU manager computing device.

FIG. 2 is a diagram illustrating an ABU manager system including the ABU manager computing device shown in FIG. 1, in communication with the payment processing system of FIG. 1.

FIG. 3 is a diagram illustrating an example of the ABU manager computing shown in FIGS. 1 and 2.

FIG. 4 is a flow chart illustrating an example method for maintaining account-on-file information using the ABU manager computing device shown in FIGS. 1 and 2 in accordance with one example embodiment of the present disclosure.

FIG. 5 is a flow chart illustrating an example method for reporting by the ABU manager computing device shown in FIGS. 1 and 2 in accordance with one example embodiment of the present disclosure.

FIG. 6 is a flow chart illustrating an example method for tracking transaction data corresponding to account-on-file transactions using the ABU manager computing device shown in FIGS. 1 and 2 in accordance with one example embodiment of the present disclosure.

DETAILED DESCRIPTION OF THE DISCLOSURE

Figure 1:
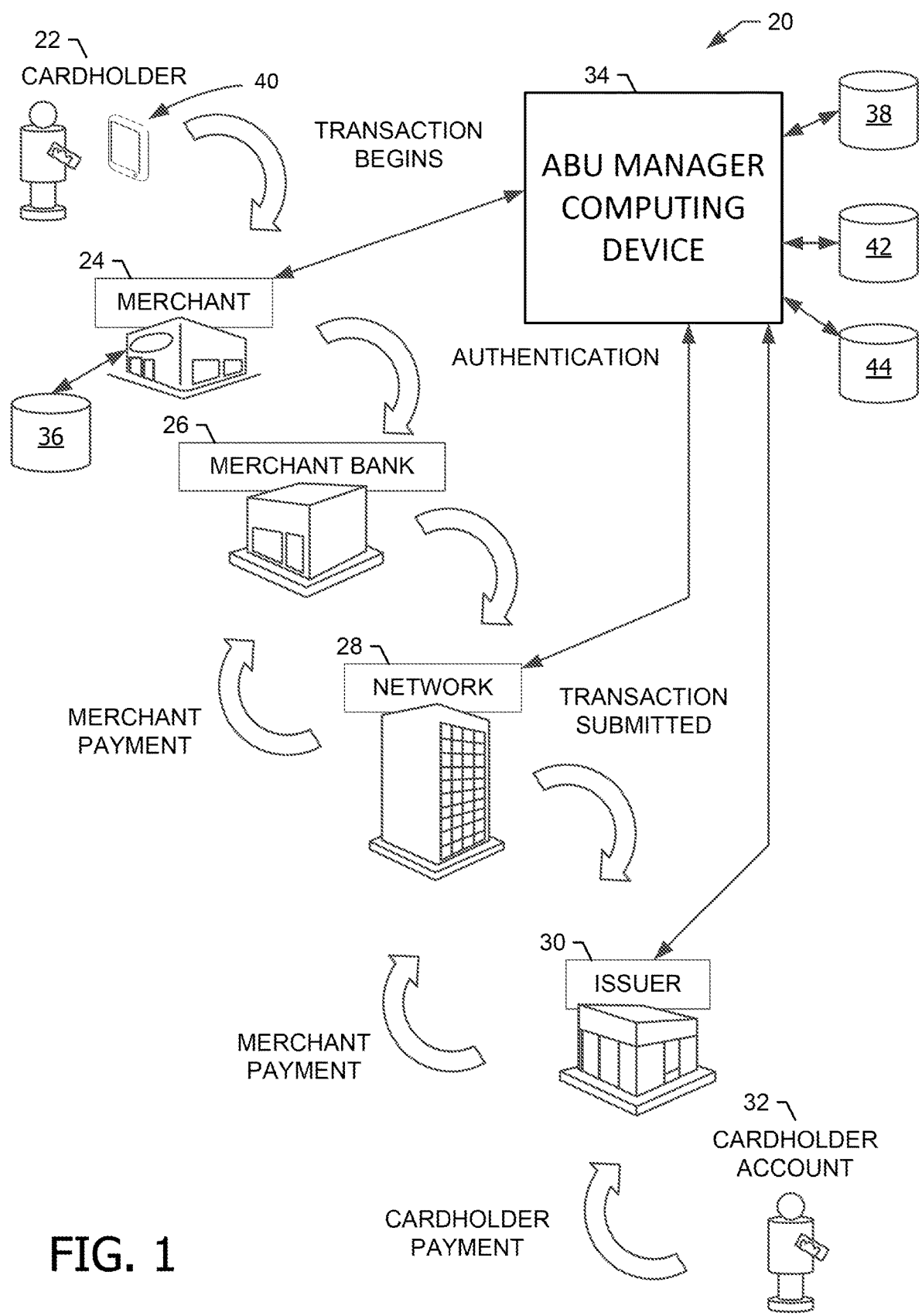
FIGS. 1-6 show example embodiments of the methods and systems described herein.

The systems and methods described herein are directed to an enhanced automatic billing updater (ABU) computing device for maintaining account data stored by merchants for account-on-file payment transactions, and for providing corresponding feedback and data to corresponding issuers. This enhanced ABU computing device is referred to herein as the ABU manager computing device.

In general, the ABU manager computing device receives account data from one or more issuers and maintains the account data in an ABU account information data source. The ABU manager computing device may then receive update requests from requesting parties, which may include one or more merchants and/or acquirer banks. The ABU manager computing device provides the requested data in an update response and receives receipt notifications indicating that the requesting party updated its corresponding account information data source, the update response message being configured to cause the requesting parties' computing devices to return transmit the receipt notifications to the ABU manager computing device. Throughout this process, the ABU manager computing device records access data in an ABU traffic data source. Access data stored in the ABU traffic data source may include, but is not limited to, (i) data describing the requesting parties, (ii) when requests for updated account data were made, and (iii) if the updated account data was applied by the requesting parties to their respective account-on-file data collections. In certain embodiments, the ABU manager computing device may also generate and transmit reports based on the access data and other data tracked by the ABU manage computing device.

The ABU manager computing device periodically receives account data from one or more issuers and maintains the account information in an ABU account information data source. If a merchant or other requesting party wishes to verify or update its account data, the requesting party may submit an update request to the ABU manager computing device. In certain embodiments, multiple update requests from one or more requesting parties may be collected and submitted to the ABU manager computing device as a batch. For example, an acquirer may collect multiple update requests from one or more merchants and submit the update requests as a batch to the ABU manager computing device.

In response to receiving an update request, the ABU manager computing device may look up or otherwise retrieve account data from the ABU account information data source. In certain embodiments, account data stored in the ABU account information data source may be stored based on account identifiers and update requests may include one or more account identifiers for which the requesting party is requesting updated account data. In response to an update request, the ABU manager computing device may generate an update response containing the retrieved account data. In certain embodiments, the update response may also include computer implementable instructions for causing a client device corresponding to the requesting party to update a corresponding data source and send a receipt notification back to the ABU manager computing device. Once generated, the ABU manager computing device may transmit the update response to the requesting party.

When the requesting party receives the update request, the requesting party (via a requesting party computing device) may execute the contained computer-executable instructions, causing the requesting party computing device to update its account-on-file data, generate a receipt notification, and transmit the receipt notification to the ABU manager computing device. The receipt notification may, among other things, indicate whether the requesting party successfully updated its account-on-file data. In response to receiving the receipt notification, the ABU manager computing device may update the ABU traffic data source to include one or more of: an identifier corresponding to the requesting party, the date/time that the ABU manager computing device received the receipt notification, and the result indicated in the receipt notification.

To facilitate transparency, the ABU manager computing device may also generate and transmit reports containing a portion of the data maintained by the ABU manager computing device to report to receiving parties, which include cardholders, merchants, acquirers, issuers, and the like. Such reports may include, but are not limited to, a listing of requesting parties having submitted update requests to the ABU manager computing device, when the most recent receipt notification was received from each requesting party, and the results indicated in such receipt notifications. The ABU manager computing device may generate and transmit a report in response to various events. For example, in some embodiments, the ABU manager computing device may automatically generate and transmit a report to a report receiving party on a predetermined schedule. In another embodiment, the ABU manager computing device may generate and transmit a report in response to receiving a report call from a report receiving party. In still other embodiments, the ABU manager computing device may generate and transmit a report if and when a receipt notification indicates that a requesting party (or a predetermined number of requesting parties) was unsuccessful in updating its account-on-file data or when the ABU manager computing device determines that a party is relying on outdated account data.

In certain embodiments, the ABU manager computing device may also maintain and generate reports based on a transaction traffic data source. The transaction traffic data source may generally store data corresponding to payment transactions between merchants and cardholders and may contain, among other data, a list of merchants associated with an account identifier, the last time a transaction was submitted by each merchant, and whether the transaction was authorized by an issuing bank. The ABU manager computing device may obtain data for storage in the transaction traffic data source from transaction-related messages generated during the course of payment card transactions. For example, the ABU manager computing device may receive an authorization request message containing transaction data from a merchant, may extract relevant portions of the transaction data contained in the authorization message, and may store the extracted transaction data in the transaction traffic data source.

The ABU manager computing device may take additional actions in response to receiving transaction-related messages. For example, the ABU manager computing device may receive an authorization request message and enhance the authorization request message by including a report for the issuer to which the authorization request message is directed. The ABU manager computing device may then transmit the enhanced message to the issuer.

In other embodiments, the ABU manager computing device may generate enhanced transaction-related messages by modifying the content of such messages. If, for example, the ABU manager computing device determines that account information contained in an authorization request message is outdated, the ABU manager computing device may enhance the authorization request message by replacing the outdated account data with current account data from the ABU account information data source. In certain embodiments, the ABU manager computing device may notify the corresponding issuer who may take any necessary remedial actions. The ABU manager computing device may also transmit a notification to the merchant indicating that the merchant's information is not current and that an update should be performed.

In certain embodiments, a cardholder may also be able to access information stored by the ABU manager computing device. For example, a payment processor or issuing bank may provide a portal or other method for a cardholder to submit a query to the ABU manager computing device. In response to the query, the ABU manager computing device may provide data to the cardholder including, but not limited to, a list of merchants from which the ABU manager computing device has received update requests, when each merchant last updated their account-on-file data, and the account data each merchant currently has on file.

The methods and systems described herein may be implemented using computer programming or engineering techniques including computer software, firmware, hardware or any combination or subset thereof, wherein the technical effect is achieved by performing at least one of: (a) receiving account data from an issuing party; (b) storing the account data in an ABU account information data source based on a plurality of account identifiers; (c) receiving an update request from a requesting party, the update request including a requested account identifier corresponding to one of the plurality of account identifiers and requesting account data corresponding to the requested account identifier; (d) generating, by the ABU manager computing device, an update response, the update response including the requested account data and computer implementable instructions for causing a client device to transmit a receipt notification; (e) transmitting the update response to the requesting party; (f) receiving a receipt notification from the requesting party, the receipt notification indicating whether the requesting party successfully updated a requesting party account information data source with the requested account data; and (g) updating, in response to receiving the receipt notification, an ABU traffic data source to indicate whether the requesting party successfully updated the requesting party account information data source with the requested account data.

The systems and methods described herein provide the technical advantages of (a) reducing the likelihood that payment card transactions will include erroneous account data, thereby reducing network bandwidth, time, and resources required to correct such transactions; (b) identifying and correcting payment card transaction-related messages containing erroneous account data, similarly reducing resources required to correct such transactions; (c) reducing the likelihood that account data will be distributed unnecessarily, such as when a merchant already has current account data; and (d) communicating utilization information regarding ABU resources to ensure that such resources are being used efficiently.

Example of Payment Card Transaction Network

FIG. 1 is a schematic diagram illustrating a payment platform 20 that includes an ABU computing device 34. Embodiments described herein may relate to a transaction card system, such as a payment card payment system using the MasterCard® interchange network. The MasterCard® interchange network is a set of proprietary communications standards promulgated by MasterCard International Incorporated for the exchange of financial transaction data and the settlement of funds between financial institutions that are associated with MasterCard International Incorporated. (MasterCard is a registered trademark of MasterCard International Incorporated located in Purchase, N.Y.).

In a typical transaction card system, a financial institution referred to as the "issuer" or "issuing bank" issues a transaction card, such as a credit card, debit card, and the like, to an accountholder 22, also referred to herein as a consumer or cardholder, who uses the transaction card to tender payment for a purchase from merchant 24. To accept payment with the transaction card, merchant 24 normally establishes an account with a financial institution that is part of the financial payment system. This financial institution is referred to as the "merchant bank," the "acquiring bank," or the "acquirer." In one embodiment, accountholder 22 tenders payment for a purchase using a transaction card at a transaction processing device 40 (e.g., a point of sale device), and merchant 24 then requests authorization from a merchant bank 26 for the amount of the purchase. The request is usually performed through the use of a point-of-sale terminal, which reads account information from a magnetic stripe, a chip, embossed characters, and the like, included on the transaction card of the accountholder 22 and communicates electronically with the transaction processing computers of merchant bank 26. In the context of transactions with online merchants, an accountholder 22 may provide their account information, such as their account number, a card verification number, an expiration date, and the like through a website. Alternatively, merchant bank 26 may authorize a third party to perform transaction processing on its behalf. In this case, the point-of-sale terminal may be configured to communicate with the third party. Such a third party may be referred to as a "merchant processor," an "acquiring processor," or a "third party processor."

Using an interchange network 28, computers of merchant bank 26 may communicate with computers of an issuer bank 30 to determine whether account 32 of accountholder 22 is in good standing and whether the purchase is covered by an available credit line of the account 32 corresponding to accountholder 22. Based on these determinations, the request for authorization may be declined or accepted. If the request is accepted, an authorization code may be issued to merchant 24.

Merchants, such as merchant 24 may store payment card account information corresponding to one or more cardholders in a merchant account information data source 36. In certain embodiments, the merchant account information data source 36 may be a local or remote database accessible by merchant 24. During a transaction, merchant 24 may retrieve account information from the merchant account information data source 36 as opposed to acquiring the information from accountholder 22, such as by having accountholder 22 provide his or her payment card account information by swiping a payment card or manually entering payment card information. So called "account-on-file" transactions may include recurring payments such as subscription fees, membership fees, electronic bills, and the like. Account-on-file transactions may also include instances when accountholder 22 is a repeat customer of merchant 24. Accordingly, account-on-file transactions generally require a cardholder to provide his or her payment card account information initially and then to authorize or enroll in an account-on-file service. Once enrolled, subsequent payments by accountholder 22 may be streamlined by either automatically charging accountholder 22 or by automatically retrieving account information corresponding to accountholder 22 from merchant account information data source 36.

For example, merchant 24 may be an internet service provider (ISP) that provides internet connectivity to accountholder 22 in exchange for a monthly service fee. Accountholder 22 may enroll in an automatic bill pay service with the ISP to pay for the monthly service charge. The ISP may store accountholder 22's account data in merchant account information data source 36. When the monthly service charge is due, the ISP may retrieve the account data from merchant account information data source 36 and may submit a transaction based on the retrieved account data to issuer 30. As another example, merchant 24 may be an online merchant from which accountholder 22 makes regular purchases. Accountholder 22 may create a user profile with the online merchant and provide his or her payment card account information, which the online merchant may then store in account information data source 36. When accountholder 22 later logs onto the online merchant's website and selects goods or services for purchase, the online merchant may retrieve accountholder 22's payment card account data and facilitate accountholder 22's purchase by automatically populating purchase forms or performing similar steps with the retrieved account data.

Although account-on-file transactions provide improved efficiency for both merchants and cardholders, payment card account information is subject to change. For example, a payment card's expiration date may lapse or an issuing bank may reissue a payment card with a different primary account number (PAN). If merchant 24 attempts to submit a transaction to issuer 30 after such a change and uses out-of-date account information, issuer 30 is likely to reject the transaction. Accordingly, an automatic billing updater (ABU) manager computing device 34 may be implemented to ensure that account data maintained by merchant 24 is current. Specifically, ABU manager computing device 34 may periodically receive payment card account information updates from one or more issuers, such as issuer 30, and store the received payment card account information in an ABU account information data source 38. ABU manager computing device 34 may then make the stored payment card account information available to merchant 24 so that merchant 24 may update merchant account information data source 36.

In certain embodiments, ABU account information data source 38 may store payment card account information for one or more cardholders, such as accountholder 22. For each payment card account of a cardholder, ABU account information data source 38 may include current account information including, but not limited to, a current account identifier and a current expiration date. ABU account information data source 38 may also store outdated account information that is linked to corresponding current account information. As a result, if an update request for current account information is submitted to ABU manager computing device 34 using outdated account information, ABU manager computing device 34 may locate the corresponding current account information in ABU account information data source 38 based on the submitted outdated account information.

To obtain current account information, merchant 24 submits an update request to ABU manager computing device 34. The update request may include one or more account identifiers, such as PANs, corresponding to cardholders for which merchant 24 is requesting current payment card account information. In response to the update request, ABU manager computing device 34 may retrieve corresponding current account information from ABU account information data source 38 and transmit a response message containing the current account information to merchant 24.

In certain embodiments, merchant bank 26 may accumulate update requests and submit a batch of update requests to ABU manager computing device 34. In certain embodiments, ABU manager computing device 34 may, for each update request in the batch, transmit a response to a corresponding merchant. In other embodiments, ABU manager computing device 34 may accumulate all relevant current account information into a response batch and transmit the response batch to merchant bank 26. Merchant bank 26 may then distribute the account information as required to each merchant that previously submitted an update request.

Merchant 24 may send a receipt notification back to ABU manager computing device 34 indicating whether merchant 24 successfully updated merchant account information data source 36 with the current account information received in response to the update request. In response to receiving the receipt notification, ABU computing device 34 may create a new entry or update an existing entry in an ABU traffic data source 42. ABU traffic data source 42 generally stores data regarding ABU activity. For example, ABU traffic data source 42 may include one or more account identifiers and, for each account identifier, when each account identifier was last updated and a list of merchants who have submitted update requests for current account information corresponding to the account identifier. ABU traffic data source 42 may also store information regarding the status of each merchant's stored payment card account information. For example, ABU traffic data source 42 may include one or more of: the date/time of the last update request received from merchant 24, the date/time of the last receipt notification received from merchant 24, and whether the latest receipt notification from merchant 24 indicated that merchant 24 successfully updated merchant account information data source 36.

In certain embodiments, ABU manager computing device 34 may be configured to determine, based on data contained in ABU account information data source 38 and ABU traffic data source 42, that merchant 24 has not received current account information corresponding to an account identifier for which merchant 24 had previously requested current account information. For example, ABU manager computing device 34 may determine that merchant 24 has not submitted an update request since a most recent update of ABU account information data source 38. In response to such a determination, ABU manager computing device 34 may generate a notification message indicating that merchant 24 has outdate account information on file and may transmit the notification message to merchant 24. Alternatively, ABU manager computing device 34 may transmit the notification message to issuer 30. Similarly, ABU manager computing device 34 may be configured to automatically generate a notification message and transmit the notification message to merchant 24 whenever ABU manager computing device 34 receives updated account information from issuer 30 corresponding to an account identifier for which merchant 24 had previously requested current account information.

ABU manager computing device 34 may generate reports and transmit those reports to parties including issuers, acquirers, merchants, cardholders, and the like. For purposes of this disclosure, the term "report receiving party" is used to refer to any party that may request or otherwise receive a report from ABU manager computing device 34. In certain embodiments, reports generated by ABU manager computing device 34 may be based on data related to a single payment card account, more than one payment card account associated with a single cardholder, or multiple payment card accounts associated with multiple cardholders. For example, ABU manager computing device 34 may generate a report for an individual cardholder listing each payment card account of the cardholder along with each merchant currently maintaining account information for each payment card account of the cardholder. As another example, ABU manager computing device 34 may generate a report including a list of merchants maintaining account information for payment cards associated with a particular issuer. Such reports may be used by an issuer to analyze spending habits of its cardholders, to identify popular merchants for potential partnership arrangements, and the like. The issuer may also use the report to identify merchants that may be relying on outdated account data. To the extent such a merchant exists, the issuer may initiate remedial measures such as notifying or alerting the merchant that its account data is not current.

ABU manager computing device 34 may be configured to generate and transmit reports based on various conditions. For example, in some embodiments, ABU manager computing device 34 may be configured to automatically generate and transmit reports based on a predetermined schedule. In other embodiments, ABU manager computing device 34 may generate and transmit reports in response to calls received from a report receiving party. In yet another embodiment, ABU manager computing device 34 may be configured to generate and transmit reports upon the occurrence of a particular ABU traffic-related event. For example, ABU manager computing device 34 may generate and transmit a report when a receipt notification indicates that merchant 24 was unsuccessful in updating merchant account information data source 36 following an update request.

In addition to recording and reporting data based on ABU traffic, ABU manager computing device 34 may also record and report data related to transactions between merchant 24 and accountholder 22. During the course of such transactions, transaction-related messages containing transaction data may be generated and transmitted between parties in payment platform 20. For example, transactions generally involve an authorization step in which transaction data is sent as an authorization request message from merchant 24 to issuer 30. Based on data contained in the authorization request message, issuer 30 determines whether to approve or decline the transaction, for example, by determining if accountholder 22 has sufficient funds and/or if the account information submitted in the authorization request message is correct. Issuer 30 then transmits an authorization response to merchant 24 indicating whether the transaction is approved or declined.

In certain embodiments, ABU manager computing device 34 may receive transaction-related messages for account-on-file transactions and record data associated with such messages in a transaction traffic data source 44. Transaction traffic data source 44 may include account identifiers corresponding to payment card accounts and, for each account identifier, include a list of merchants that have performed account-on-file transactions using the payment card account. For each merchant, the transaction traffic data source 44 may also include the date/time of the most recent account-on-file transaction by each merchant, whether the most recent account-on-file transaction was approved or declined, and the like.

Identification of transaction-related messages that correspond to account-on-file transactions may be performed in various ways. For example, in some embodiments, a transaction-related message may include a flag or similar indicator that identifies the message as one relating to an account-on-file transaction. In other embodiments, merchant 24, merchant bank 26, issuer 30, and the like may only transmit transaction-related messages to ABU manager computing device 34 if the transaction-related messages originated from account-on-file transactions. In still another embodiment, ABU manager computing device 34 may receive a transaction-related message and perform a look-up in ABU traffic data source 42 to determine whether the merchant identified in the transaction-related message conducts account-on-file transactions using the payment card account identified in the transaction-related message. Regardless of how ABU manager computing device 34 identifies transaction-related messages as being associated with an account-on-file transaction, ABU manager computing device 34 may create or update an entry in transaction traffic data source 42 with data contained in the transaction-related messages. Such information may include, but is not limited to, the date/time of the transaction, the amount of the transaction, the goods or services being purchased, and the like.

In certain embodiments, ABU manager computing device 34 may generate, in response to receiving the transaction-related message, a notification message based on a comparison of transaction data contained in the transaction-related message to data stored one of transaction traffic data source 44, ABU traffic data source 42, and ABU account information data source 38 and transmit the notification message to one or more of merchant 24, issuing party 30, and the like. The notification message may be used to indicate at least one of: (i) an inconsistency between an account identifier contained in the transaction-related message and a corresponding current account identifier stored in the ABU account information data source; (ii) a decline of a prior transaction submitted by merchant 24 using the account identifier included in the transaction-related message; (iii) that merchant 24 likely has outdated account information stored in merchant account information data source 36; (iv) that ABU manager computing device 34 did not receive a receipt notification corresponding to a prior update request submitted by merchant 24; and (v) an inconsistency between timing of the transaction-related message and timing of prior transaction-related messages, for example, if the transaction-related message is received mid-month and all prior transaction-related messages were received on a monthly basis on the first of the month.

In certain embodiments, the ABU manager computing device 34 may also generate enhanced transaction-related messages by supplementing the transaction-related messages with additional data or modifying existing data contained in the transaction-related messages. For example, if ABU manager computing device 34 receives an authorization request message to be sent to issuer 30 from merchant 24, ABU manager computing device 34 may generate a report including data regarding merchant 24, accountholder 22, or the specific payment card account used during the transaction. ABU manager computing device 34 may then enhance the authorization request message to include the report before transmitting the enhanced authorization request message to issuer 30. Similar to the previously discussed notification messages, enhanced transaction-related messages may be used to indicate at least one of: (i) an inconsistency between an account identifier contained in the transaction-related message and a corresponding current account identifier stored in the ABU account information data source; (ii) a decline of a prior transaction submitted by merchant 24 using the account identifier included in the transaction-related message; (iii) that merchant 24 likely has outdated account information stored in merchant account information data source 36; (iv) that ABU manager computing device 34 did not receive a receipt notification corresponding to a prior update request submitted by merchant 24; and (v) an inconsistency between timing of the transaction-related message and timing of prior transaction-related messages.

As an example, ABU manager computing device 34 may be configured to determine whether the account information provided by merchant 24 in an authorization request message is outdated such as by determining whether the expiration date of the payment card account identified in the authorization request has passed and has since been replaced by a new expiration date. If account information is out of date, ABU manager computing device 34 may generate an enhanced authorization request message replacing the expired account information with current account information and may transmit the enhanced authorization request to the issuer. In such cases, ABU manager computing device 34 may also transmit a notification to the merchant indicating that the merchant's account-on-file information is out of date. In certain embodiments, the notification may include the updated account information. Alternatively, the ABU manager computing device 34 may enhance the corresponding authorization response message sent by the issuer to indicate that the merchant's account information is out of date and/or to include the updated account information.

Example of an Account Billing Updater System

Figure 2:
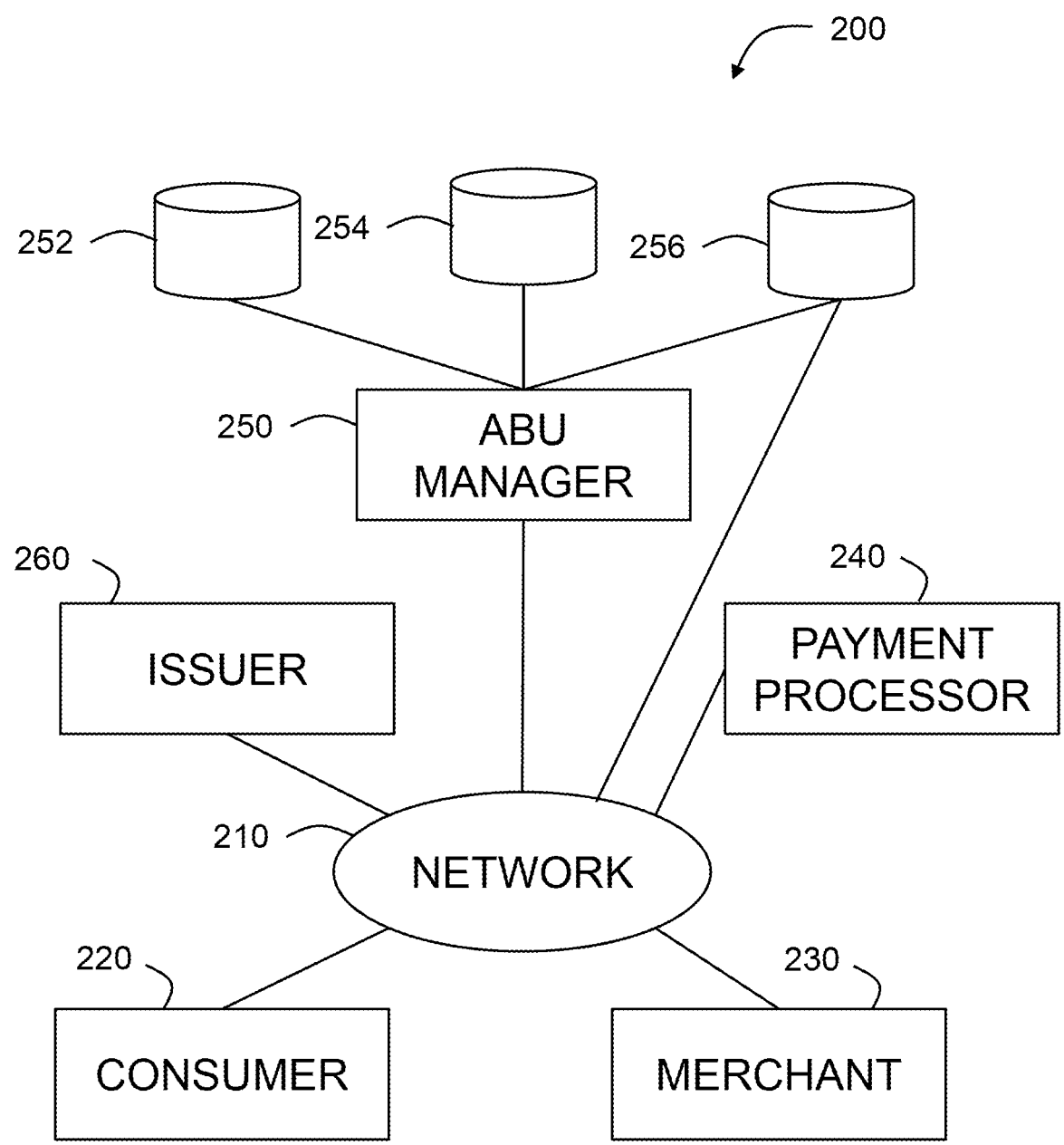

FIG. 2 is a diagram illustrating an automatic billing updater (ABU) manager system 200 including a consumer, a merchant, a payment processor, an issuer, and an ABU, which may correspond to ABU manager computing device 34 (shown in FIG. 1), in accordance with an example embodiment of the present disclosure.

Referring to FIG. 2, ABU manager system 200 includes computing devices that respectively represent a consumer 220, a merchant 230, a payment processor 240, an ABU manager 250, and an issuing bank ("issuer") 260 which are connected to each other via network 210. Network 210 may include the Internet, the interchange network 28 of FIG. 1, and/or one or more other networks. For example, a connection between the computing devices may include a wireless network, a wired network, a telephone network, a cable network, a combination thereof, and the like. Examples of suitable connections include, but are not limited to, WiFi, WiMAX, WiBro, local area network, personal area network, metropolitan area network, cellular, Bluetooth, and the like.

Consumer 220 may be a computing device, for example, a mobile phone, a smart phone, a telephone, a computer, a laptop, a desktop, a tablet, an MP3 player, a digital assistant, a server, and the like. Consumer 220 may communicate with merchant 230 in various ways including accessing a website that corresponds to or that is hosted by merchant 230, contacting a phone number of merchant 230, and the like. Payment processor 240 may be a processing entity such as MASTERCARD®, VISA®, AMERICAN EXPRESS®, and the like. Issuer 260 may be a third-party bank that issued a payment card to a cardholder. For example, issuer 260 may correspond to payment processor 240.

Merchant 230 corresponds to a computing device configured to accept and process payment card transactions and to maintain a merchant account information data source, such as a database, that includes payment card account information associated with one or more cardholders. The merchant account information data source may be incorporated into merchant 230 or may be otherwise accessible by merchant 230 via a network, such as network 210. The information maintained in the merchant account information data source may generally be used to facilitate account-on-file transactions, such as automatic recurring payments.

ABU manager 250 is generally configured to receive account data from an issuing party, such as issuer 260, to store the account data, and to provide the account data to a requesting party, such as merchant 230. ABU manager 250 is further configured to track and report use of the account data maintained by ABU manager 250.

ABU manager 250 may include or have access to one or more data sources. For example, in the embodiment of FIG. 2, ABU manager 250 has access to an ABU account information data source 252, an ABU traffic data source 254, and a transaction traffic data source 256. Each of ABU account information data source 252, an ABU traffic data source 254, and a transaction traffic data source 256 may be stored in an internal storage device of ABU manager 250 or may be remote to ABU manager 250 but otherwise accessible by ABU manager 250. Each of ABU account information data source 252, ABU traffic data source 254, and transaction traffic data source 256 may be stored on one or more data storage devices in one or more databases, tables, or similar storage structures.

ABU account information data source 252 contains account data received from one or more issuing parties, such as issuer 260. ABU account information data source 252 may be updated by ABU manager 250 in response to receiving account data from issuer 260 over network 210. In certain embodiments, the account data may be sent by issuer 260 according to a predetermined schedule (e.g., daily, bi-weekly, etc.). In other embodiments, ABU manager 250 may make a call to issuer 260 and account data may be sent by issuer 260 to ABU manager 250 in response to the call. In still other embodiments, issuer 260 may automatically send account data to ABU manager 250 upon changes to account data associated with one or more cardholders.

ABU manager 250 generally sends account data to requesting parties, such as merchant 230, upon receiving an update request. Update requests may be received over network 210 directly from merchant 230 or may be batched together by an acquirer, such as merchant bank 26 of FIG. 1, and transmitted to ABU manager 250 in a batched format. Update requests generally include one or more account identifiers corresponding to payment card accounts for which the requesting party is requesting account data. In response to receiving an update request, ABU manager 250 retrieves the account data corresponding to the one or more account identifiers, generates an update response including the account data, and sends the update response to the requesting party. In certain embodiments, update responses may also include computer executable instructions, such as a script, configured to cause the requesting party to update an account information data source of the requesting party, to generate a receipt notification indicating whether the update was a successful, and to transmit the receipt notification to ABU manager 250.

In conjunction with an update request, ABU manager 250 may create an entry or update an existing entry in ABU traffic data source 254. ABU traffic data source 254 generally stores tracking data corresponding to requests for account data stored in ABU account information data source 252. In certain embodiments, ABU traffic data source 254 includes a list of account identifiers and, for each account identifier, a list of requesting parties (e.g., merchants) that have previously submitted update requests to ABU manager 250 for account data regarding the particular account identifier. For each requesting party, ABU traffic data source 254 may also include one or more of: (i) the last date/time the requesting party submitted an update request, (ii) the last date/time an update response was sent by ABU manager 250 to the requesting party, (iii) the last date/time a receipt notification was received from the requesting party, and (iv) the status (e.g., whether the corresponding update was successful) indicated in the last receipt notification from the requesting party.

ABU manager 250 may also be configured to receive messages transmitted over network 210 during a payment card transaction. For example, in certain embodiments, ABU manager 250 may receive authorization messages such as authorization request messages sent from merchant 230 to issuer 260 and/or authorization response messages sent from issuer 260 to merchant 230. In response to receiving a transaction-related message, ABU manager 250 may generate and transmit a notification message or enhance the transaction-related message by supplementing or modifying the data stored in the message. ABU manager 250 may then transmit the notification message or enhanced transaction-related message, as required.

As ABU manager 250 processes transaction-related messages, ABU manager 250 may create or update entries in transaction traffic data source 256. In certain embodiments, transaction traffic data source 256 may include entries corresponding to account-on-file transactions. For example, for one or more transaction-related messages corresponding to account-on-file transactions, transaction traffic data source 256 may store one or more of a payment card number, a payment card expiration date, a merchant identifier, a transaction amount, a date/time, a description of the goods/services purchased and the like. ABU manager 250 may also use transaction traffic data source 256 to track when transaction messages include outdated account data. Accordingly, transaction traffic data source 256 may include a field indicating one or more of what type of data was outdated in a given transaction message, the outdated data itself, and any substitute data provided by ABU manager 250 in a notification message or enhance transaction-related message.

In certain embodiments, ABU manager 250 may process only transaction messages related to account-on-file transactions. Accordingly, in certain embodiments merchants and issuer may transmit only messages related to account-on-file transactions to ABU manager 250. In other embodiments, ABU manager 250 or another computing device may filter transactions messages related to account-on-file transactions from messages sent over network 210. For example, a transaction message may include a flag or other indicator identifying the transaction message as an account-on-file transaction. In still other embodiments, ABU manager 250 may examine transaction data contained in a transaction message to determine whether the transaction message corresponds to an account-on-file transaction based on historical transaction data, such as data maintained in transaction traffic data source 256. For example, ABU manager 250 may use an account number, merchant, amount, and the like contained in the transaction data and identify similar transactions in the transaction traffic data source 256. ABU manager 250 may also determine whether the similar transactions occur at regular intervals or are for similar amounts, each of which may be indicative of a recurring account-on-file payment.

ABU manager 250 may be further configured to generate and transmit reports based on data stored in any of ABU account information data source 252, ABU traffic data source 254, and transaction traffic data source 256. Reports may be generated and provided for one or more parties including but not limited to cardholders, merchants, acquirers, and issuing banks, and may contain different data depending on the party for which the report is generated. For example, ABU manager 250 may generate a report for a cardholder that lists all merchants that perform account-on-file transactions using the cardholder's payment card account information and for each merchant the date and amount of the most recent transaction by the merchant and the account number and expiration date maintained by the merchant. In a second example, ABU manager 250 may generate a report for a merchant that lists any account information submitted by the merchant that was inconsistent with data in one of ABU account information data source 252, ABU traffic data source 254, and transaction traffic data source 256. In a third example, ABU manager 250 may generate a report for an acquirer summarizing which of the acquirer's merchants utilize account-on-file transaction services such that the acquirer may mark such services to non-participating merchants. In a final example, ABU manager 250 may generate a report for an issuer that includes a list of merchants maintaining account information for payment card accounts issued by the issuer.

In certain embodiments, ABU manager 250 may generate and transmit reports in response to a request from a party. For example, one of a cardholder, an acquirer, a merchant, and an issuer may submit a report request to ABU manager 250. In certain embodiments, a report requests may include account identifiers, merchant identifiers, or other data to identify the data to be included in the report. In other embodiments, ABU manager 250 may be configured to automatically generate and transmit reports. For example, ABU manager 250 may generate and transmit a report based on a predetermined schedule (e.g., daily, monthly, bi-weekly). ABU manager 250 may also be configured to automatically generate a report based on the occurrence of a particular event. For example, ABU manager 250 may automatically generate and transmit a report when ABU manager 250 determines that a merchant has submitted out-of-date account information in an authorization request message.

Reports may take various forms. For example, in certain embodiments, reports generated by ABU manager 250 may be created as a document in a markup language, such as extensible markup language (XML). In other embodiments, reports may be generated as messages that conform to one or more standards. Such standards may include, but are not limited to ISO 8583 and ISO 20022, which generally provide specifications for the format and content of messages related to electronic transactions made by cardholders using payment cards and message transmitted between financial institutions, respectively. In still other embodiments, reports may be generated in a format compatible with and inserted into other messages transmitted over network 210. For example, ABU manager 250 may generate a report suitable for insertion into an authentication request or response message sent between a merchant and an issuer over network 210.

Example of an ABU Manager Computing Device

Figure 3:
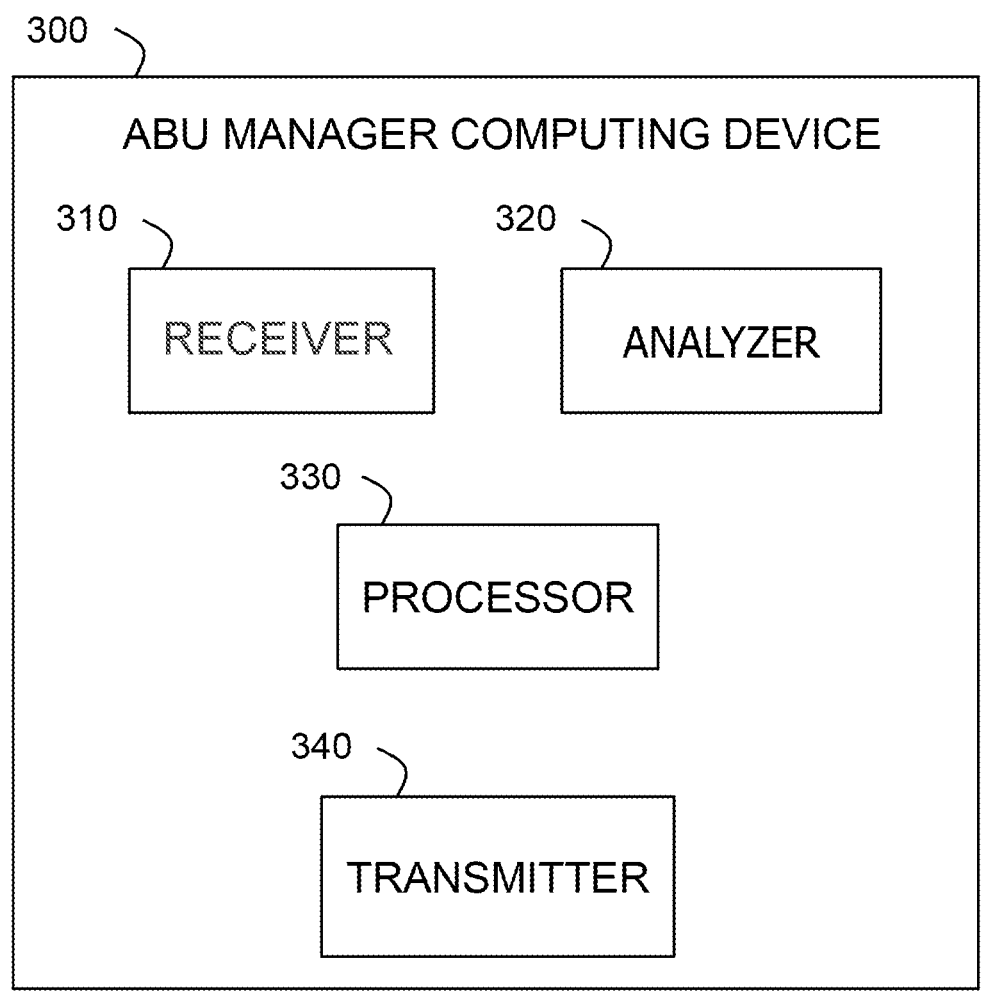

FIG. 3 is a diagram illustrating an example embodiment of an ABU manager computing device that may be included in the ABU manager system of FIG. 2, in accordance with an example embodiment of the present disclosure.

Referring to FIG. 3, ABU manager computing device 300 may correspond to ABU manager 250 shown in FIG. 2. ABU manager computing device 300 may be coupled to payment processor 240 or may be a separate computing device included in the system of FIG. 2, and may be connected to one or more of the other computing devices via the network 210. In this example, ABU manager computing device 300 includes a receiver 310, an analyzer 320, a processor 330, and a transmitter 340. ABU manager computing device 300 may include additional components not shown, or less than the amount of components shown. Also, one or more of the components in this example may be combined or may be replaced by processor 330. The computer components described herein (e.g., receiver 310; analyzer 320; processor 330; and transmitter 340) may include hardware and/or software elements that are specially configured or programmed to perform the steps described herein.

Receiver 310 is generally configured to receive account data from one or more issuers, such as issuer 260 of FIG. 2. Such account data may include, but is not limited to, payment card account numbers, payment card account expiration dates, and the like. Receiver 310 may also be configured to retrieve account data from various data sources. For example, receiver 310 may receive account data from each of ABU account information data source 252, ABU traffic data source 254, and transaction traffic data source 256 as depicted in FIG. 2. Receiver 310 may also be configured to receive update requests for account data stored in account information data source 252 from one or more parties, such as a merchant or acquiring bank, and corresponding receipt notifications transmitted by such parties in response to receiving the requested account data. In certain embodiments, receiver 310 may also be configured to receive messages sent over an interchange network, such as network 210 of FIG. 2, which may include, but are not limited to, authorization request messages and authorization response messages. In certain embodiments receiver 310 may also be configured to receive report requests in which a party requests a report based, at least in part, on data contained in one or more of an ABU account information data source, an ABU traffic data source, and a transaction traffic data source, such as ABU account information data source 252, ABU traffic data source 254, and transaction traffic data source 256, respectively, of FIG. 2. Messages and account data received by receiver 310 may be in a batch format that aggregates multiple messages or data corresponding to multiple accounts. Accordingly, receiver 310 may be configured to parse individual messages and account data entries from such batched formats.

Analyzer 320 analyzes data and messages received through receiver 310. Analyzer 320 generally determines the type of data or message received and identifies how the data or message is to be processed by processor 330. In certain embodiments, analyzer 320 may determine whether data or messages received by receiver 310 include flags or other data that identify the type of data or message received by receiver 310. For example, the data may identify the message as one of an update request, a report request, or a transaction-related message such as an authorization request or authorization response message. In other embodiments, analyzer 320 may compare the received data or message with historical data to determine the type of message received and whether it is subject to additional processing by ABU manager computing device 300. For example, analyzer 320 may receive a transaction-related message and determine whether the message corresponds to an account-on-file transaction based on the merchant data, the account data, and/or the transaction data contained in the message.

After analysis by analyzer 320, processor 330 may further analyze and process data and messages received by receiver 310 and perform additional ABU-related functions.

In response to receiving updated account data from an issuing party, processor 330 may generally update an ABU account information data source, such as ABU account information data source 252 of FIG. 2. For example, processor 330 may determine whether the updated account data received from the issuing party includes account data corresponding to an account for which data is maintained in the ABU account information data source. Processor 330 may also compare any existing account data in the ABU account information data source with that of the updated account data to determine if any changes have occurred. Processor 330 may also add new entries to ABU account information data source for any data corresponding to new accounts or overwrite any outdated account data contained in the ABU account information data source.

When updating existing records in the ABU account information data source, processor 330 may also populate data fields or create records for the account data being overwritten. Such fields or records may be cross-referenced or otherwise linked to the corresponding updated account data received from the issuing party. Doing so permits ABU manager computing device 300 to identify current account data corresponding to outdated account data that may be submitted by a merchant, an acquiring bank, and the like.

In response to receiving an update request from a requesting party, processor 330 may retrieve the requested account data. More specifically, processor 330 may determine what account data is being requested, generate a request or query for retrieving the requested account data from the ABU account information data source, submit the request to ABU account information data source, and, after receiving the requested account data, generate an update response containing the requested data for transmission to the requesting party by transmitter 340. In certain embodiments, processor 330 may also include machine executable code in update response messages that cause the requesting party to update an account information data source of the requesting party and to generate and transmit a receipt notification indicating whether the update was successfully completed by the requesting party.

In addition to processing requested account data, processor 330 may also create or update entries in an ABU traffic data source, such as ABU traffic data source 254 of FIG. 2. The ABU traffic data source may generally store information regarding ABU activity. Accordingly, for one or more payment card accounts, processor 330 may create or modify records in the ABU traffic data source indicating merchants, acquiring banks, and the like who have submitted update requests, the date/time of the most recent update request from merchants, the date/time of any receipt notifications corresponding to update requests, the results indicated in receipt notifications, and the like.

In certain embodiments, processor 330 may be configured to analyze the contents of the ABU account information data source and the ABU traffic data source, to generate corresponding notification messages based on the results of such analyses, and to transmit the notification messages to relevant parties. For example, processor 330 may cross-reference date and time data stored in the ABU account information data source indicating when current account data was received with date and time data stored in the ABU traffic data source indicating when a merchant or acquiring bank last submitted an update request. To the extent the current account data occurred after the last submitted update request, processor 330 may generate a notification message indicating the discrepancy. The notification message may then be sent to the merchant, the acquiring bank, the issuing bank, and the like to notify the parties of the outdated information. In other embodiments, such notifications may be sent automatically whenever ABU manager computing device 300 receives updated account information from an issuing party.

Processor 330 may also be configured to process transaction-related messages corresponding to payment card transactions and to create or modify records in a transaction traffic data source, such as transaction traffic data source 256 of FIG. 2. In certain embodiments, the transaction traffic data source may contain one or more of a list of merchants associated with an account identifier, the last time a transaction was submitted by each merchant, whether the transaction was authorized by an issuing bank, and the like. Transaction-related messages may include, for example, authorization request and authorization response messages sent between merchants and issuers. In response to receiving a transaction-related message corresponding to an account-on-file transaction, processor 330 may generate at least one of a notification message and an enhanced transaction-related message containing additional or supplemental data. For example, if ABU manager computing device 300 receives an authorization request message from a merchant corresponding to an account-on-file transaction, processor 330 may determine whether the account data contained in the message is current. To the extent the account data in the message is not current, processor 330 may generate and transmit a corresponding notification message to one or more of the relevant merchant, issuing bank, acquiring bank, etc. Alternatively, processor 330 may generate an enhanced transaction-related message by supplementing or modifying the transaction-related message with additional and/or updated data. For example, processor 330 may generate an enhanced transaction-related message by one or more of: (i) replacing an outdated account number with a current account number; (ii) replacing an outdated expiration date with a current expiration date; (iii) including a flag or other data indicating that the merchant involved in the transaction has outdated account information on file; and (iv) including summary or other report data based on data contained in one or more of the ABU account information data source, the ABU traffic data source, and the transaction traffic data source.

Processor 330 may also generate reports containing or based on data from one or more of the ABU account information data source, the ABU traffic data source, and the transaction traffic data source. Generation and transmission of a report may be according to a request received by ABU manager computing device 300, a predetermined schedule, or as the result of a predefined event, such as a merchant submitting outdated account data.

In certain embodiments, ABU manager computing device 300 may also include a transmitter 340 for transmitting data, including, but not limited to update response messages; enhanced transaction-related messages; requests/queries for account data from one or more of an ABU account information data source, an ABU traffic data source, and a transaction traffic data source; reports based on data contained in one or more of an ABU account information data source, an ABU traffic data source, and a transaction traffic data source; and the like.

Example Methods for Maintaining Account-on-File Information

Figure 4:
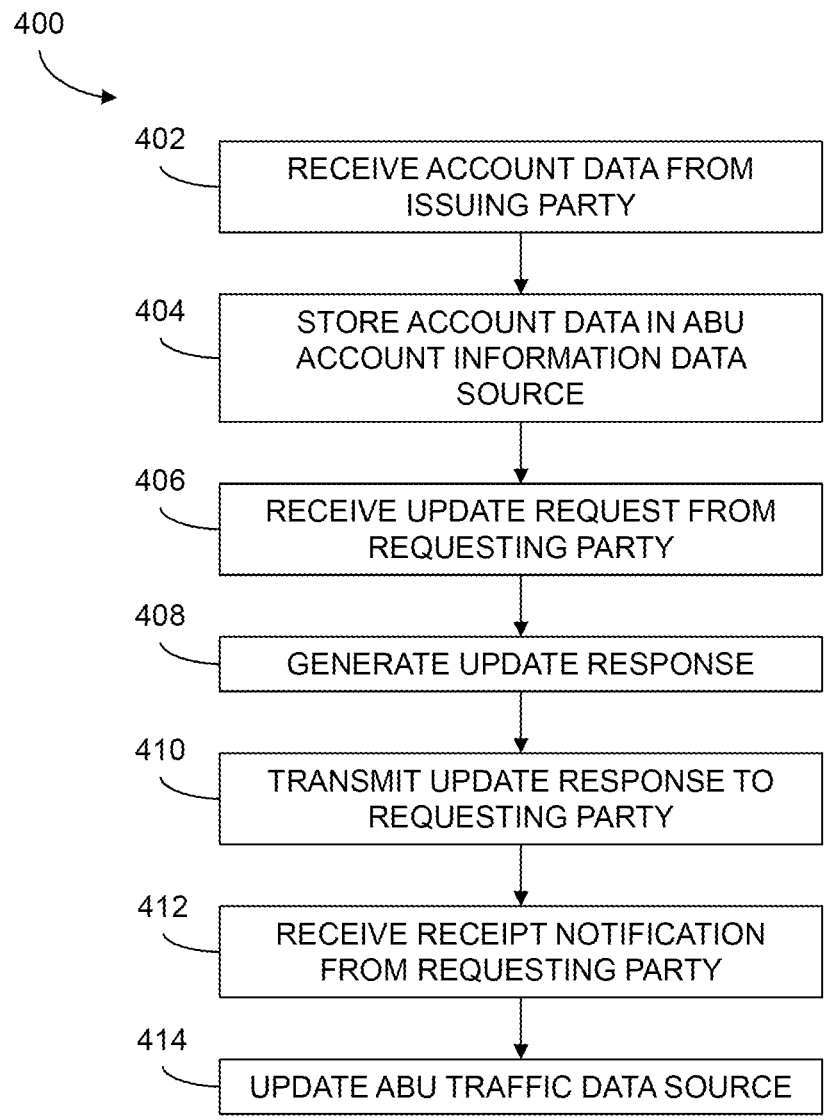

FIG. 4 is a diagram illustrating an example of a method 400 for maintaining account-on-file information that may be performed by an ABU manager computing device, such as ABU manager computing device 300 of FIG. 3.

Initially, the ABU manager computing device receives account data from an issuing party 402, which may be an issuing bank. In certain embodiments, the ABU manager computing account first submits an account data request to the issuing party and is provided the account data in response. In other embodiments, the issuing party may transmit account data to the ABU manager computing device without a call by the ABU manager computing device. For example, the issuing party may transmit account data according to a predetermined schedule, whenever a change to any account data occurs, or whenever the account data corresponding to a predetermined quantity of accounts has changed.

The ABU manager computing device may then store the account data in an ABU account information data source 404. Storing the account data in the ABU account information data source may include creating new entries or overwriting existing entries in the ABU account information data source. Storing the account data may also include updating corresponding data such as a last date/time updated data field or updating data fields for containing outdated account data. The account data may be stored in the ABU account information data source based on account identifiers. For example, the ABU account information data source includes an account identifier for each payment card account that the ABU account information data source stores current account data. Such current account data may include, but is not limited to, a payment card account number, a payment card expiration date, a security code, and the like.

The ABU manager computing device may receive an update request from a requesting party 406, such as a merchant or acquiring bank, that maintains payment card account information on file. The update request may generally include an identifier corresponding to the requesting party and one or more account identifiers corresponding to the accounts for which the requesting party is requesting current account information.

In response to the update request, the ABU manager computing device may generate an update response 408 by identifying the account data being requested, retrieving the requested account data from the ABU account information data source, and formatting the account data for transmission. Once generated, the ABU manager computing device may transmit the update response message to the requesting party 410. In certain embodiments, the update response may include computer executable code configured to cause the requesting party to update its account-on-file information data source, to generate a receipt notification, and to transmit the receipt notification, which may be received by the ABU manager computing device 412.

In response to receiving a receipt notification, the ABU manager computing device may update an ABU traffic data source 414, which generally stores tracking data regarding ABU activity. Accordingly, ABU manager computing device may create or modify records in the ABU traffic data source with data including, but not limited to, the date/time of the update request from the requesting party, the date/time of the receipt notification received after transmitting the update response, and any data, such as update results, that may be included in the receipt notification.

Figure 5:
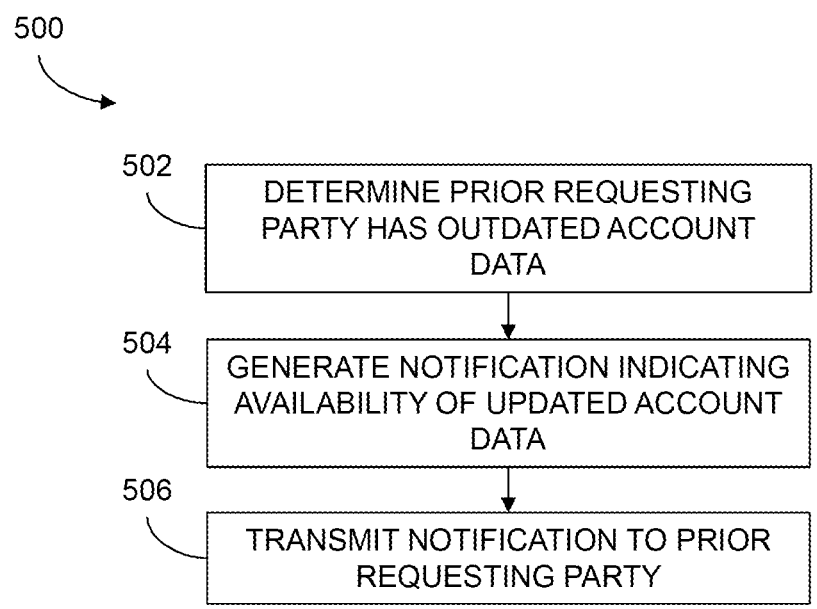

FIG. 5 is a diagram illustrating an example of a method 500 for generating and providing notification messages by an ABU manager computing device, such as ABU manager computing device 300 of FIG. 3.

In certain embodiments, ABU manager computing devices in accordance with this disclosure may be configured to monitor data maintained in one or more of an ABU account information data source, an ABU traffic data source, and a transaction traffic data source. Based on changes to or discrepancies within these data sources, the ABU manager computing device may generate and transmit notification messages in order to alert entities related to the stored account data to such changes or discrepancies.

Notification messages may be generated according to a predetermined schedule or may be generated in response to particular events. For example, in some embodiments, the ABU manager computing device may generate a notification message whenever the ABU manager computing device receives updated account data for a particular payment card account. The ABU manager computing device may then transmit the notification to merchants and acquiring banks that, based on records in the ABU traffic data source, have previously requested account data corresponding to the payment card account. In other embodiments, the ABU manager computing device may periodically analyze data contained in any of the ABU account information data source, the ABU traffic data source, and the transaction traffic data source and determine whether a notification message is to be sent. For example, the ABU manager computing device may compare the date and time that current account data was received from an issuing party with the last date or time an update request was submitted by a merchant. If the update request occurred before the most recent update to the account data, the ABU manager computing device may generate and transmit a notification to the merchant indicating that more current account data is available for the merchant.

In the method illustrated in FIG. 5, the ABU manager computing device first determines that a prior requesting party, such as a merchant or acquiring bank, has outdated account information on file 502. In certain embodiments, the ABU manager computing device may perform such a determination by analyzing account data contained in one or more of the ABU account information data source, the ABU traffic data source, and the transaction traffic data source to identify discrepancies between current account data and account data maintained on file by the prior requesting party. In other embodiments, the ABU manager computing device may automatically determine a prior requesting party has outdated account information on file whenever the ABU manager computing device received updated account data from an issuing party. In still another embodiment, the ABU manager computing device may determine that a prior requesting party has outdated account data if the prior requesting party submits a transaction-related message including outdated account data.

In response to determining that the prior requesting party has outdated account information, the ABU manager computing device may generate a notification indicating the availability of updated account data 504. In certain embodiments, the notification may operate as an alert that simply notifies the prior requesting party that the prior requesting party has outdated account information. In other embodiments, the notification may include some or all of the current account information. Once generated, the notification may then be transmitted by the ABU manager computing device to the prior requesting party 506.

In certain embodiments, notifications generated by the ABU manager may be created as a document in a markup language, such as extensible markup language (XML). In other embodiments, notifications may be generated as messages that conform to one or more standards. Such standards may include, but are not limited to ISO 8583 and ISO 20022, which generally provide for the format and content of messages related to electronic transactions made by cardholders using payment cards and message transmitted between financial institutions, respectively. In still other embodiments, reports may be generated in a format compatible with and inserted into other messages transmitted over a network. For example, the ABU manager may generate a notification suitable for insertion into an authentication request or response message sent between a merchant and an issuer over a network, such as network 210 of FIG. 2.

Figure 6:
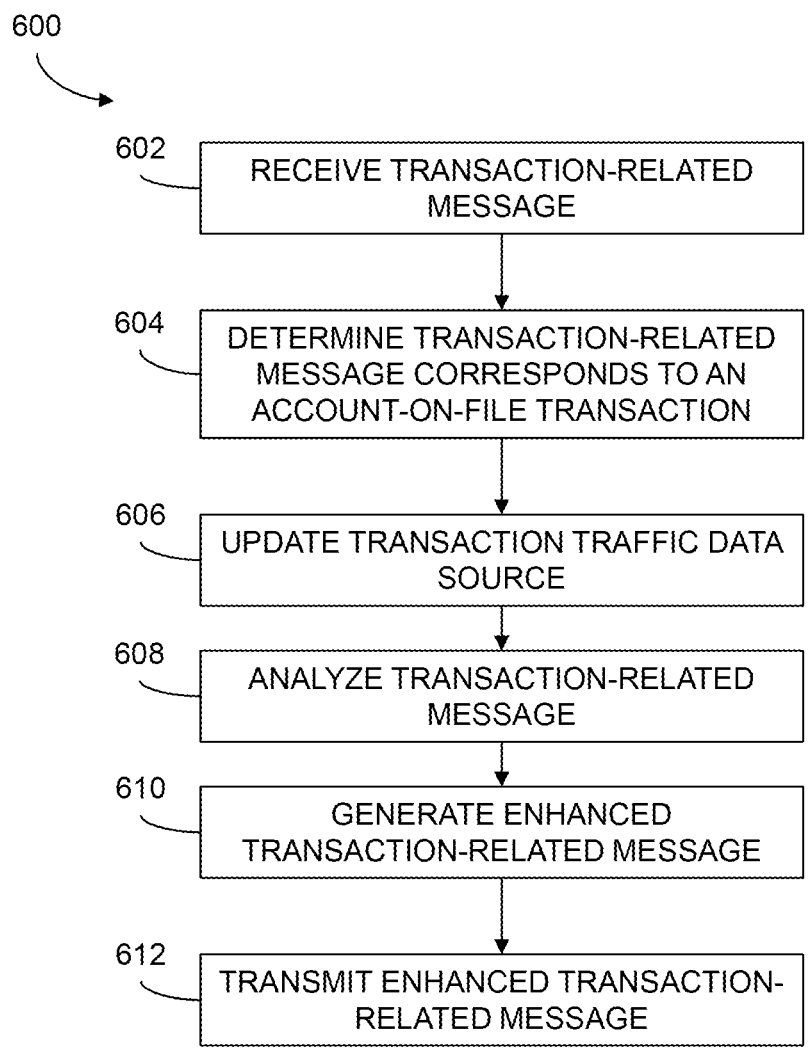

FIG. 6 is a diagram illustrating an example of a method 600 for tracking transaction traffic related to account-on-file transactions using an ABU manager computing device, such as ABU manager computing device 300 of FIG. 3.

During the course of a payment card transaction, the ABU manager computing device may receive a transaction-related message 602, which may include an authorization request message, an authorization response message, or other messages containing transaction data that may be transmitted over a network, such as network 210.

The ABU manager computing device may then determine whether the transaction-related message corresponds to an account-on-file transaction 604. In certain embodiments the ABU manager computing device may do so by determining whether the message includes a flag or similar indicator that identifies the message as corresponding to an account-on-file transaction. In other embodiments, the ABU manager computing device may analyze the data contained in the message and compare the data to historical transaction data to determine whether the message is likely a recurring account-on-file transaction. For example, the ABU manager computing device may determine if the merchant submitting the transaction, the amount of the transaction, and/or the date/time of the transaction is consistent with previous transactions and, as a result, may indicate that the transaction is for a subscription, membership, or similar payment. In certain embodiments, the ABU manager computing device may only receive transaction-related messages corresponding to account-on-file transactions. For example, a merchant, issuer, or acquirer may only transmit messages related to account-on-file transactions to the ABU manager computing device.

In response to receiving a transaction-related message corresponding to an account-on-file transaction, the ABU manager computing device may update a transaction traffic data source 606. The transaction traffic data source may include account identifiers corresponding to payment card accounts and, for each account identifier, include a list of merchants that have performed account-on-file transactions using the payment card account. For each merchant, the transaction traffic data source may also include the date/time of the most recent account-on-file transaction by each merchant, whether the most recent account-on-file transaction was approved or declined, and the like.

The ABU manager computing device may also analyze the transaction-related message 608 in order to determine whether the transaction-related message is to be enhanced. Enhancement generally refers to the process of modifying or supplementing a message and may be done to correct errors in the original message, to include additional data in the message to be sent to the recipient, and the like. For example, the ABU manager computing device may analyze an authorization request message from a merchant and determine that the message includes outdated account data. In response, the ABU manager computing device may replace the existing account data in the authorization request message with the current account data stored in the ABU account information data source. As another example, the ABU manager computing device may analyze a transaction-related message and determine that the recipient of the message is to receive a report as described above. In response, the ABU manager computing device may enhance the transaction-related message with the report. After the ABU manager computing device generates an enhanced transaction-related message 610, the ABU manager computing device may transmit the enhanced transaction-related message 612.

ADDITIONAL CONSIDERATIONS

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for maintaining account-on-file information. In this example, the computing device may include a memory device and a processor in communication with the memory device, and when executed by said processor, the computer-executable instructions may cause the processor to perform a method, such as the methods described and illustrated in the examples of FIGS. 4-6.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An automatic billing updater (ABU) manager computing device, said ABU manager computing device comprising one or more processors in communication with one or more memory devices, the one or more memory devices including an ABU account information data source, an ABU traffic data source, and a transaction traffic data source, said ABU manager computing device configured to:
  receive, by the one or more processors, current account data for a plurality of account identifiers from a plurality of issuing parties;
  store, by the one or more processors, the current account data in the ABU account information data source based on each respective account identifier;
  receive, by the one or more processors and via the Internet, an update request from a client device of a merchant of a plurality of merchants, the update request including a requesting party identifier corresponding to the merchant and a requested account identifier corresponding to one of the plurality of account identifiers, the update request requesting current account data corresponding to the requested account identifier;
  generate, by the one or more processors, an update response in response to performing a look up in the ABU account information data source, the update response including the requested current account data and computer-executable code configured to cause the client device to automatically update a merchant data source associated with the client device;
  transmit, by the one or more processors via the Internet, the update response to the client device;
  receive, by the one or more processors via the Internet and in response to transmitting the update response, a receipt notification from the client device, the receipt notification indicating whether the merchant data source associated with the client device has been successfully updated with the requested current account data; and
  update, by the one or more processors, the ABU traffic data source to indicate whether the merchant data source has been successfully updated with the requested account data.

2. The ABU manager computing device in accordance with claim 1 further configured to:
  determine, by the one or more processors and based on data included in the ABU account information data source and the ABU traffic data source, that the merchant has not received the current account data;
  in response to determination, generate, by the one or more processors, a notification indicating that the merchant has outdated information associated with the plurality of account identifiers; and
  transmit, by the one or more processors and via the Internet, the notification to the client device, wherein the update request is received in response to the notification.

3. The ABU manager computing device in accordance with claim 2 further configured to:
  receive, by the one or more processors and via the Internet, a report request from a second client device associated with an individual cardholder, the report request identifying at least one account identifier associated with the individual cardholder;
  generate, by the one or more processors, an individual cardholder report in response to performing a look up in the ABU account information data source, the individual cardholder report listing each of the plurality of merchants currently maintaining account information for the at least one account identifier; and
  transmit, by the one or more processors and via the Internet, the individual cardholder report to the second client device.

4. The ABU manager computing device in accordance with claim 3 further configured to:
  transmit, by the one or more processors, the individual cardholder report as a document in a markup language.

5. The ABU manager computing device in accordance with claim 1 further configured to:
  receive, by the one or more processors and via the Internet, a report request from a third client device associated with an issuer of the plurality of issuing parties;
  generate, by the one or more processors, an issuer report in response to performing a look up in the ABU account information data source, the issuer report listing each of the plurality of merchants currently maintaining account information for each of a set of account identifiers issued by the issuer; and
  transmit, by the one or more processors and via the Internet, the issuer report to the third client device.

6. The ABU manager computing device in accordance with claim 5 further configured to:
  transmit, by the one or more processors, the issuer report as a document in a markup language.

7. The ABU manager computing device in accordance with claim 1 further configured to:
  receive, by the one or more processors, a transaction-related message corresponding to a payment card transaction between the merchant and a cardholder of an account corresponding to one of the plurality of account identifiers, the transaction-related message including transaction data including a transaction account expiration date and a transaction account identifier;
  detect, by the one or more processors, a mismatch between the current account data in the ABU account information data source and at least one of the transaction account expiration date and the transaction account identifier;
  generate, by the one or more processors and in response to the mismatch, a merchant report indicating that the merchant has outdated account information; and
  transmit, by the one or more processors, the merchant report to the client device.

8. A computer-implemented method for tracking access data for a data source including notifications of data updates from client devices, said method implemented using an automatic billing updater (ABU) manager computing device including one or more processors in communication with one or more memory devices, the one or more memory devices including an ABU account information data source, an ABU traffic data source, and a transaction traffic data source, said method comprising:
  receiving, by the one or more processors, current account data for a plurality of account identifiers from a plurality of issuing parties;
  storing, by the one or more processors, the current account data in the ABU account information data source based on each respective account identifier;
  receiving, by the one or more processors and via the Internet, an update request from a client device of a merchant of a plurality of merchants, the update request including a requesting party identifier corresponding to the merchant and a requested account identifier corresponding to one of the plurality of account identifiers, the update request requesting current account data corresponding to the requested account identifier;
  generating, by the one or more processors, an update response in response to performing a look up in the ABU account information data source, the update response including the requested current account data and computer-executable code configured to cause the client device to automatically update a merchant data source associated with the client device;
  transmitting, by the one or more processors and via the Internet, the update response to the client device;
  receiving, by the one or more processors and via the Internet and in response to transmitting the update response, a receipt notification from the client device, the receipt notification indicating whether the merchant data source associated with the client device has been successfully updated with the requested current account data; and
  updating, by the one or more processors, the ABU traffic data source to indicate whether the merchant data source has been successfully updated with the requested account data.

9. The method in accordance with claim 8 further comprising:
  determining, by the one or more processors and based on data included in the ABU account information data source and the ABU traffic data source, that the merchant has not received the current account data;
  in response to the determining, generating, by the one or more processors, a notification indicating that the merchant has outdated information associated with the plurality of account identifiers; and
  transmitting, by the one or more processors and via the Internet, the notification to the client device, wherein the update request is received in response to the notification.

10. The method in accordance with claim 9 further comprising:
  receiving, by the one or more processors and via the Internet, a report request from a second client device associated with an individual cardholder, the report request identifying at least one account identifier associated with the individual cardholder;

generating, by the one or more processors, an individual cardholder report in response to performing a look up in the ABU account information data source, the individual cardholder report listing each of the plurality of merchants currently maintaining account information for the at least one account identifier; and transmitting, by the one or more processors and via the Internet, the individual cardholder report to the second client device.

11. The method in accordance with claim 10 further comprising:

transmitting, by the one or more processors, the individual cardholder report as a document in a markup language.

12. The method in accordance with claim 8 further comprising:

receiving, by the one or more processors and via the Internet, a report request from a third client device associated with an issuer of the plurality of issuing parties;

generating, by the one or more processors, an issuer report in response to performing a look up in the ABU account information data source, the issuer report listing each of the plurality of merchants currently maintaining account information for each of a set of account identifiers issued by the issuer; and transmitting, by the one or more processors and via the Internet, the issuer report to the third client device.

13. The method in accordance with claim 12 wherein transmitting, via the Internet, the issuer report to the third client device comprises transmitting, by the one or more processors, the issuer report as a document in a markup language.

14. The method in accordance with claim 8 further comprising:

receiving, by the one or more processors, a transaction-related message corresponding to a payment card transaction between the merchant and a cardholder of an account corresponding to one of the plurality of account identifiers, the transaction-related message including transaction data including a transaction account expiration date and a transaction account identifier;

detecting, by the one or more processors, a mismatch between the current account data in the ABU account information data source and at least one of the transaction account expiration date and the transaction account identifier;

generating, by the one or more processors and in response to the mismatch, a merchant report indicating that the merchant has outdated account information; and transmitting, by the one or more processors, the merchant report to the client device.

15. A non-transitory computer-readable storage medium having computer-executable instructions embodied thereon, wherein when executed by an automatic billing updater (ABU) manager computing device having one or more processors in communication with one or more memory devices, the one or more memory devices including an ABU account information data source, an ABU traffic data source, and a transaction traffic data source, the computer-executable instructions cause the ABU manager computing device to:

receive, by the one or more processors, current account data for a plurality of account identifiers from a plurality of issuing parties;

store, by the one or more processors, the current account data in the ABU account information data source based on each respective account identifier;

receive, by the one or more processors and via the Internet, an update request from a client device of a merchant of a plurality of merchants, the update request including a requesting party identifier corresponding to the merchant and a requested account identifier corresponding to one of the plurality of account identifiers, the update request requesting current account data corresponding to the requested account identifier;

generate, by the one or more processors, an update response in response to performing a look up in the ABU account information data source, the update response including the requested current account data and computer-executable code configured to cause the client device to automatically update a merchant data source associated with the client device;

transmit, by the one or more processors and via the Internet, the update response to the client device;

receive, by the one or more processors and via the Internet and in response to transmitting the update response, a receipt notification from the client device, the receipt notification indicating whether the merchant data source associated with the client device has been successfully updated with the requested current account data; and update, by the one or more processors, the ABU traffic data source to indicate whether the merchant data source has been successfully updated with the requested account data.

16. The non-transitory computer-readable storage medium in accordance with claim 15, wherein the computer-executable instructions further cause the ABU computing device to:

determine, by the one or more processors and based on data included in the ABU account information data source and the ABU traffic data source, that the merchant has not received the current account data;

in response to determination, generate, by the one or more processors, a notification indicating that the merchant has outdated information associated with the plurality of account identifiers; and transmit, by the one or more processors and via the Internet, the notification to the client device, wherein the update request is received in response to the notification.

17. The non-transitory computer-readable storage medium in accordance with claim 16, wherein the computer-executable instructions further cause the ABU computing device to:

receive, by the one or more processors and via the Internet, a report request from a second client device associated with an individual cardholder, the report request identifying at least one account identifier associated with the individual cardholder;

generate, by the one or more processors, an individual cardholder report in response to performing a look up in the ABU account information data source, the individual cardholder report listing each of the plurality of merchants currently maintaining account information for the at least one account identifier; and transmit, by the one or more processors and via the Internet, the individual cardholder report to the second client device.

18. The non-transitory computer-readable storage medium in accordance with claim 17, wherein the computer-executable instructions further cause the ABU computing device to:

transmit, by the one or more processors, the individual cardholder report as a document in a markup language.

19. The non-transitory computer-readable storage medium in accordance with claim 15, wherein the computer-executable instructions further cause the ABU computing device to:

receive, by the one or more processors and via the Internet, a report request from a third client device associated with an issuer of the plurality of issuing parties;

generate, by the one or more processors, an issuer report in response to performing a look up in the ABU account information data source, the issuer report listing each of the plurality of merchants currently maintaining account information for each of a set of account identifiers issued by the issuer; and transmit, by the one or more processors and via the Internet, the issuer report to the third client device.

20. The non-transitory computer-readable storage medium in accordance with claim 15, wherein the computer-executable instructions further cause the ABU computing device to:

receive, by the one or more processors, a transaction-related message corresponding to a payment card transaction between the merchant and a cardholder of an account corresponding to one of the plurality of account identifiers, the transaction-related message including transaction data including a transaction account expiration date and a transaction account identifier;

detect, by the one or more processors, a mismatch between the current account data in the ABU account information data source and at least one of the transaction account expiration date and the transaction account identifier;

generate, by the one or more processors and in response to the mismatch, a merchant report indicating that the merchant has outdated account information; and transmit, by the one or more processors, the merchant report to the client device.

* * * * *